US011995770B2

(12) United States Patent
Schmidt et al.

(10) Patent No.: US 11,995,770 B2
(45) Date of Patent: *May 28, 2024

(54) SYSTEM AND METHOD FOR ISOLATING ANATOMICAL FEATURES IN COMPUTERIZED TOMOGRAPHY DATA (71) Applicant: K2M, Inc., Leesburg, VA (US)

(72) Inventors: John Schmidt, Bluemont, VA (US); Jennifer McCool, Boyce, VA (US)

(73) Assignee: K2M, Inc., Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,052

(22) Filed: Mar. 21, 2023

(65) Prior Publication Data
US 2023/0222735 A1    Jul. 13, 2023

Related U.S. Application Data (63) Continuation of application No. 17/279,335, filed as application No. PCT/US2019/052646 on Sep. 24, 2019, now Pat. No. 11,636,650.
(Continued)

(51) Int. Cl.
G06T 17/10    (2006.01)
G06T 7/00    (2017.01)

(52) U.S. Cl.
CPC ............ G06T 17/10 (2013.01); G06T 7/0012 (2013.01); G06T 2207/10028 (2013.01); G06T 2207/30012 (2013.01); G06T 2210/41 (2013.01)

(58) Field of Classification Search
None
See application file for complete search history.

(56) References Cited

U.S. PATENT DOCUMENTS 7,657,072 B2    2/2010 Periaswamy et al.
8,139,829 B2    3/2012 Goto et al.
(Continued)

FOREIGN PATENT DOCUMENTS

WO    9959106 A1    11/1999
WO    2017027873 A1    2/2017

OTHER PUBLICATIONS

Lavecchia et al, 'Lumbar model generator: a tool for the automated generation of a parametric scalable model of the lumbar spine', J. R. Soc. Interface 15: 20170829. http://dx.doi.org/10.1098/rsif.2017.0829, Jan. 3, 2018.*

(Continued)

Primary Examiner — Patrick F Valdez
(74) Attorney, Agent, or Firm — Howard & Howard Attorneys PLLC (57) ABSTRACT The technology relates to generating a three-dimensional point cloud model of an anatomical structure. A computer accessible memory stores a three-dimensional array of data elements describing multiple anatomical features of a subject, each of the data elements having associated therewith positional data and a separate parameter value. A processor may be configured to identify any data elements in the three-dimensional array having an associated parameter value satisfying a predefined threshold value associated with at least one anatomical feature. The processor may be further configured to generate a visually displayable three-dimensional point cloud model of at least one anatomical structure having a first plurality of points in the point cloud model which define an exterior perimeter of the at least one anatomical structure and a second plurality points in the point cloud model which define at least one feature interior of the exterior perimeter of the at least one anatomical structure.

13 Claims, 11 Drawing Sheets

Related U.S. Application Data (60) Provisional application No. 62/735,341, filed on Sep. 24, 2018.

(56) References Cited

U.S. PATENT DOCUMENTS

| | | | |
|---|---|---|---|
| 8,527,244 | B2 | 9/2013 | Shin |
| 9,177,414 | B2 | 11/2015 | Park et al. |
| 9,265,434 | B2 | 2/2016 | Merschon et al. |
| 9,393,130 | B2 | 7/2016 | Suddaby et al. |
| 9,408,638 | B2 | 8/2016 | Kroll et al. |
| 9,561,004 | B2 | 2/2017 | Forsberg |
| 9,566,163 | B2 | 2/2017 | Suddaby et al. |
| 9,572,601 | B2 | 2/2017 | Stenulson et al. |
| 9,585,762 | B2 | 3/2017 | Suddaby et al. |
| 9,937,011 | B2 * | 4/2018 | Yosibash ............... A61B 5/055 |
| 10,049,471 | B2 | 8/2018 | Greenburg |
| 10,417,812 | B2 * | 9/2019 | Djorgovski ........... G06T 19/003 |
| 10,867,436 | B2 | 12/2020 | Oved |
| 10,874,460 | B2 | 12/2020 | Schmidt et al. |
| 10,892,058 | B2 | 1/2021 | Schmidt et al. |
| 10,987,169 | B2 | 4/2021 | Turner et al. |
| 11,207,135 | B2 | 12/2021 | Schmidt et al. |
| 2009/0034790 | A1 * | 2/2009 | Song ..................... G01V 5/226 378/10 |
| 2009/0232378 | A1 | 9/2009 | Nakamura |
| 2011/0295378 | A1 | 12/2011 | Bojarski et al. |
| 2013/0004043 | A1 | 1/2013 | Ross et al. |
| 2013/0077840 | A1 | 3/2013 | Blumfield et al. |
| 2014/0228860 | A1 | 8/2014 | Steines et al. |
| 2014/0323845 | A1 | 10/2014 | Forsberg |
| 2015/0328004 | A1 | 11/2015 | Mafhouz |
| 2015/0348259 | A1 | 12/2015 | Souza et al. |
| 2016/0022323 | A1 | 1/2016 | Seme et al. |
| 2016/0166396 | A1 | 6/2016 | McClintock |
| 2016/0317187 | A1 | 11/2016 | Seme et al. |
| 2017/0228896 | A1 | 8/2017 | Yu et al. |
| 2017/0287216 | A1 * | 10/2017 | Kim ..................... H04L 67/1097 |
| 2018/0144539 | A1 * | 5/2018 | Kredi ..................... G06T 15/08 |
| 2018/0165004 | A1 | 6/2018 | Hurley et al. |
| 2018/0329609 | A1 * | 11/2018 | De Swarte ............ G06T 19/00 |
| 2021/0398350 | A1 | 12/2021 | Schmidt et al. |

OTHER PUBLICATIONS

Newe et al, 'Simplified Generation of Biomedical 3D Surface Model Data for Embedding into 3D Portable Document Format (PDF) Files for Publication and Education', Plos One, 8(11), pp. 1-8. (Year: 2013).*

Chougule, 'Development of patient specific implants for Minimum Invasive Spine Surgeries (MISS) from non-invasive imaging techniques by reverse engineering and additive manufacturing techniques', Procedia Engineering, 97, pp. 212-219. (Year: 2014).*

Chougule et al., "Development of Patient Specific Implants for Minimum Invasive Spine Surgeries (MISS) from Non-Invasive Imaging Techniques by Reverse Engineering and Additive Manufacturing Techniques", Procedia Engineering, vol. 97, 2014, pp. 212-219.

Huynh, Kim Tho et al., "Development of a Detailed Human Spine Model With Haptic Interface", In Haptics Rendering and Applications, www.intechopen.com, InTech, 2012, 32 pages.

International Search Report for Application No. PCT/US2018/041831 dated Nov. 19, 2018, 4 pages.

International Search Report for Application No. PCT/US2018/053743 dated Dec. 21, 2018, 1 page.

International Search Report for Application No. PCT/US2019/052646 dated Jan. 2, 2020, 3 pages.

Paulano-Godino et al., "Identification of Fracture Zones and Its Application in Automatic Bone Fracture Reduction", Computer Methods and Programs in Biomedicine, 2017, p. 141.

* cited by examiner

SYSTEM AND METHOD FOR ISOLATING ANATOMICAL FEATURES IN COMPUTERIZED TOMOGRAPHY DATA

CROSS-REFERENCE TO RELATED APPLICATIONS

This application is a Continuation of U.S. patent application Ser. No. 17/279,335 filed on Mar. 24, 2021, which claims the benefit of the filing date of International Patent Application No. PCT/US2019/052646 filed on Sep. 24, 2019 which, in turn, claims the benefit of the filing date of U.S. Provisional Patent Application No. 62/735,341 filed Sep. 24, 2018, the disclosures of each of which are hereby incorporated herein by reference.

BACKGROUND

1. Technical Field

This disclosure pertains generally to modeling aspects of the human skeleton, and, more particularly, to developing and using models of the spine and its constituent vertebral body components for surgical preplanning so as to obtain a balanced spine.

2. Discussion of Current Technologies

The goal of some spinal surgeries and the spinal devices that are used in those surgeries is to correct a spine so that it is in "sagittal balance." In short, sagittal balance means that the skull is positioned over or aligned with the pelvis. Many surgeons use preoperative and intraoperative medical imaging technology to guide them through the surgical procedure to ensure that "sagittal balance" is achieved. In many spinal surgical procedures, spinal devices, such as pedicle screws, plates and rods are secured to various vertebral bodies comprising spinal column. The shape and placement of a patient's vertebral bodies illustrated in a preoperative or intraoperative image oftentimes provides visual clues to the surgeon in selecting the appropriate spinal devices and hardware necessary to secure them to one or more vertebral bodies. Unfortunately, most current medical imaging technology does not provide an indication of the internal properties of an anatomical structure, such as the density or location of cancellous bone beneath the cortical bone exterior of a vertebral body. Accordingly, the surgeon must make educated estimates as to which tools, e.g. drillbits, and which hardware, e.g. screws, cervical plates, etc. to use during a spinal surgical procedure.

Today a wide-variety of medical imaging technologies are commercially available and used to perform various surgical procedures, including those involving the spine. Computerized Tomography (CT) scanning is one such commercially available medical imaging technology. In computerized tomography, a scanning apparatus creates an array of picture elements and associated radio density information at a defined resolution distance. In CT scans, a voxel is utilized to represent a single sample, or data point in a grid array, and has associated therewith a data value representing the opacity of the material at that point in the array to X-rays, otherwise known as radio density, as measured in Hounsfield units.

The porous or spongy cancellous bone within the interior of a vertebral body of the spine is often difficult to detect in a two-dimensional axial slice of conventional CT scan because of its low density in Houndsfield units. Accordingly, the stack of two-dimensional axial slices generated as the output from a conventional CT scanner provide the viewer with outline images of the cortical exterior surfaces of bony structures, such as vertebral bodies, but are typically devoid of any indication of the interior cancellous bone features beneath the surface of the cortical bone exterior. Prior attempts have been made to model bony structures using finite element analysis as well as solid modeling of the bony structures, however, such models typically illustrate only the exterior surface of the bony structure and do not provide a visually renderable model in which a practitioner can simultaneously see the features of both the cortical bone exterior layer and the internal cancellous bone region contained within the cortical bone exterior layer.

Accordingly a need exists for a system and technique which enables data representing selected anatomical features to be isolated and extracted from the output of a computer tomography scanner for more accurate viewing and modeling.

A still further need exists for a system and technique which enables the creation of an accurate three-dimensional model of an anatomical structure including visually discernible features within the interior, that is within the exterior surface of the anatomical structure, particularly with bony structures and vertebral bodies.

An even further need exists for a system and technique which enables the creation of an accurate three-dimensional model of a bony structures including visually discernible features of the interior cancellous bone underneath the cancellous bone exterior surface of a vertebral body.

A further a need exists for a system and technique which enables the creation of an accurate three-dimensional model of an anatomical structure which enables surgeons to more accurately choose the appropriate tools and hardware to obtain successful results in a surgical procedure.

SUMMARY

Disclosed are systems and methods for rapid generation of three-dimensional point cloud models of a patient's spinal morphology that enable pre-operative viewing of a patient's condition to assist surgeons in determining the best corrective procedure and selection of spinal devices based on the patient specific simulated condition. Specifically, the three-dimensional point cloud models enable simultaneous viewing of both the exterior perimeter of cortical bone of a vertebral body and regions of cancellous bone interior of the exterior perimeter to enable better understanding of the internal structure of the vertebral body preoperatively. In one embodiment, the three-dimensional point cloud model is derived from spatial coordinates extracted from computer tomography (CT) scan data sets based on their respective accompanying radio density values. With the disclosed systems and techniques, the data extracted from the CT scan data set is not converted into polygon rendered models but is rendered in point cloud format to enable transparent viewing of both the internal and external features of a vertebral body. The resulting three-dimensional point cloud models do not depend on stacks of two-dimensional slices of the CT scan data or the JPEG/grayscale format requirements of the DICOM specification(s) and can be generated rapidly.

According to one aspect of the disclosure, a system for generating a three-dimensional point cloud model of an anatomical structure, the system comprises: a computer accessible memory operational to store a three-dimensional array of data elements describing multiple anatomical features of a subject, each of the data elements having associated therewith positional data and a separate parameter value; and a processor, operatively coupled to the computer accessible memory, operational to identify any data elements in the three-dimensional array having an associated parameter value satisfying a predefined threshold value associated with at least one anatomical feature, the processor further operational to acquire from the computer accessible memory positional data associated with the data elements identified as having an associated parameter value satisfying the predefined threshold value and store the acquired positional data in a computer memory; wherein the processor is further operational to generate, from the acquired positional data stored in the computer memory, a visually displayable three-dimensional point cloud model of the at least one anatomical structure having a first plurality of points in the point cloud model which define an exterior perimeter of the at least one anatomical structure and a second plurality points in the point cloud model which define at least one feature interior of the exterior perimeter of the at least one anatomical structure, both the first plurality and second plurality points in the point cloud model being simultaneously visually discernable. In one embodiment, the at least one anatomical structure comprises a bony structure with the first plurality of points in the point cloud model representing the cortical bone exterior perimeter of the bony structure and the second plurality of points in the point cloud model representing the interior cancellous bone regions contained within the exterior of cortical bone.

According to another aspect of the disclosure, a method for generating a point cloud model of an anatomical structure, the method comprising: A) accessing a three-dimensional array of data elements describing at least a portion of physical anatomy of a subject, each of the data elements having associated therewith positional data and a separate parameter value; B) identifying any data elements in the three-dimensional array having an associated parameter value within a predefined range of threshold values; C) acquiring positional data associated with the data elements identified as having an associated parameter value within the predefined range of threshold values and storing the acquired positional data in memory; D) generating from the extracted positional data stored in memory a three-dimensional model of at least part of the anatomy portion of the subject.

According to still another aspect of the disclosure, a method for generating a point cloud model of an anatomical feature, the method comprises: A) accessing a three-dimensional array of data elements describing multiple anatomical features of a subject, each of the data elements having associated therewith positional data and a separate parameter value; B) identifying any data elements in the three-dimensional array having an associated parameter value within a predefined range of threshold values associated with at least one anatomical feature; C) acquiring positional data associated with the data elements identified as having an associated parameter value within the predefined range of threshold values associated with the at least one anatomical feature and storing acquired positional data in memory; D) generating from the acquired positional data stored in memory a three-dimensional point cloud model of at least a part of the at least one anatomical feature.

According to yet another aspect of the disclosure, a viewable three dimensional point cloud model simultaneously defining an exterior perimeter of representing cortical bone of the boney structure and regions of cancellous bone interior of the exterior perimeter, the point cloud model prepared by the process of comprising: A) accessing a three-dimensional array of data elements describing at least a portion of physical anatomy of a subject, each of the data elements having associated therewith positional data and a separate radio density value; B) identifying any data elements in the three-dimensional array having an associated radio density value within a predefined range of threshold values; C) acquiring positional data associated with the data elements identified as having an associated radio density value at least equal to the threshold value and storing the acquired positional data in memory; and D) generating from the acquired positional data stored in memory a visually displayable three-dimensional point cloud model of at least part of the anatomy portion of the subject.

BRIEF DESCRIPTION OF THE DRAWINGS

Various aspects of the present disclosure are described herein with reference to the drawings, wherein.

DETAILED DESCRIPTION

Embodiments of the systems and methods are now described in detail with reference to the drawings in which like reference numerals designate identical or corresponding elements in each of the several views. As used herein, the term "clinician" refers to a doctor, a nurse, or any other care provider and may include support personnel. Throughout this description, the phrase "in embodiments" and variations on this phrase generally is understood to mean that the particular feature, structure, system, or method being described includes at least one iteration of the disclosed technology. Such phrase should not be read or interpreted to mean that the particular feature, structure, system, or method described is either the best or the only way in which the embodiment can be implemented. Rather, such a phrase should be read to mean an example of a way in which the described technology could be implemented, but need not be the only way to do so.

As used herein, the term "sagittal plane" refers to a plane that divides the body into left and right halves and is parallel to an x-axis, the term "coronal plane" refers to a plane that divides the body into front and back (or posterior and anterior) portions and is parallel to a y-axis, the term "height" refers to a distance along a z-axis.

According to embodiments of the present disclosure, the position of the spine and skull are quantified in three-dimensional space by performing image processing and analysis of the spine. The resulting three-dimensional point cloud model of the spine may be compared to three-dimensional models of the curvature of other spines and analyzed in view of medical data related to the spine to determine an appropriate treatment plan to ensure both sagittal and coronal balance. The treatment plan may include constructing or modifying a surgical device and deploying such devices in, on, or near the spine based on the analysis of the three-dimensional model of the target spine.

Figure 1:
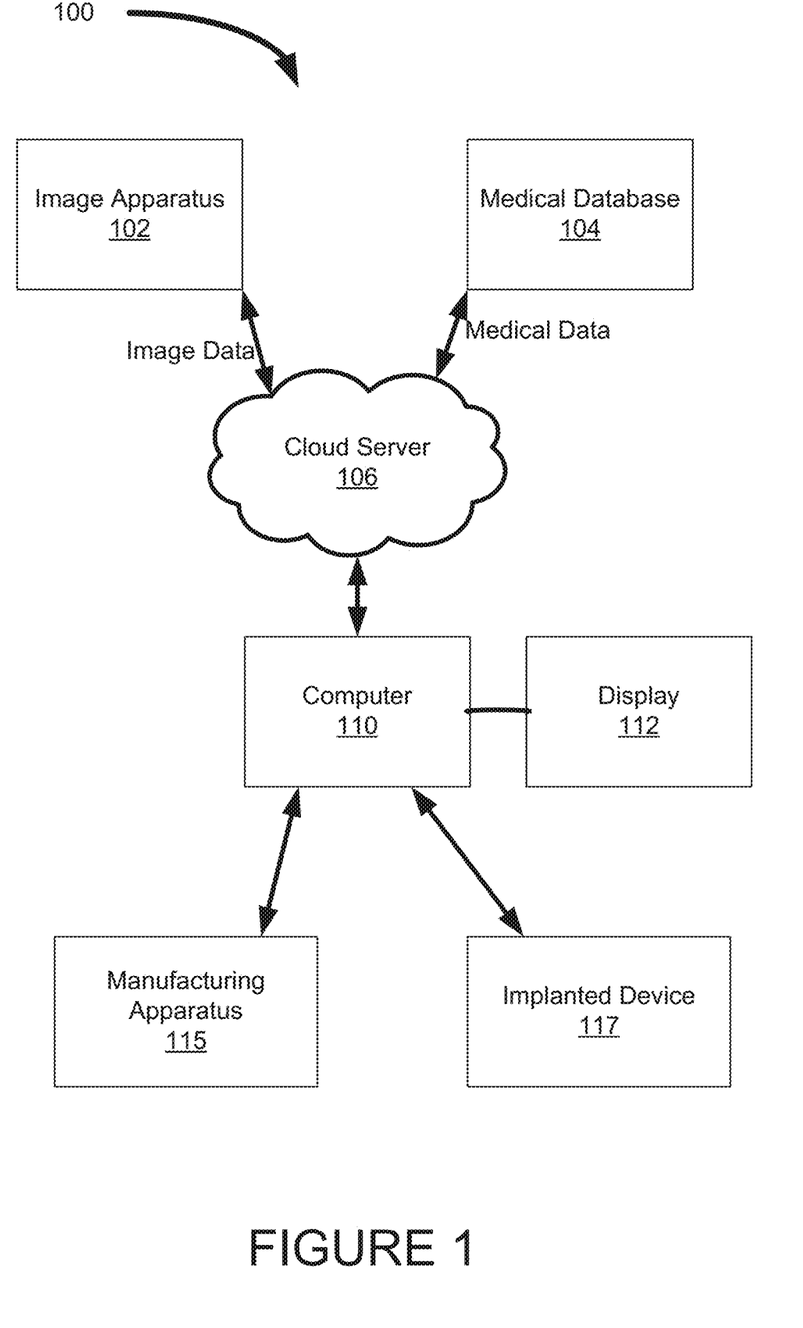
FIG. 1 is a block diagram illustrating a system architecture for generating multilayer point cloud models of anatomical structures in accordance with some embodiments.

FIG. 1 is a block diagram illustrating a system architecture for performing spinal imaging, analysis, and surgery in accordance with some embodiments. In some embodiments, an imaging apparatus 102 provides images to a cloud server 106. The cloud server 106 may be secured in such a way that it complies with the privacy protection provisions of the Health Insurance Portability and Accountability Act of 1996 (HIPAA). In other embodiments, the imaging apparatus 102 provides images to a computer or a server that may better protect patient information than cloud server 106. The imaging apparatus 102 may be any a computerized tomography (CT) apparatus that is configured to capture images of the human skeleton.

The system architecture 100 may also include a medical database 104 that transmits and stores medical data in the cloud server 106. The medical database 104 may reside in a doctor's office, in a hospital, or any other location that is remotely accessible over a wide area computer network. The medical database 104 may contain a variety of medical data that is useful in determining the method of performing spinal surgery and the parameters of the spinal device(s) used to correct the misalignment of the spine. This medical data may include all medical conditions that are or may be relevant to the spine, including, for example, osteoporosis, adolescent idiopathic scoliosis, adult scoliosis, neuromuscular disease, and degenerative disc disease. In embodiments, the medical data may include one or more of the following: patient demographics, progress notes, vital signs, medical histories, human clinical data, diagnoses, medications, Cobb Angle measurements, adverse events, operative complications, implant complications, operative time, blood loss, immunization dates, allergies, X-ray images, such as coronal and sagittal X-ray images, CT scan data, magnetic resonance imaging (MRI) data, or other medical image data as well as lab and test results.

Cloud server 106 may store the medical images and medical data in a way to allow for easy access by computer 110 that has access to the cloud server 106. Access by the computer 110 to the cloud server 106 may be via a wired and/or wireless connection, such as through a local network and/or a global network, such as the Internet. Computer 110 may display on a connected or integrated display, such as display 112, the images and the medical data to assist a clinician in planning for and performing a spinal surgery. Based on the medical images and the medical data, computer 110 analyzes medical images and generates a three-dimensional point cloud model to assist the clinician in determining the appropriate method of performing a spinal surgery and/or the parameters of the medical device to ensure that proper alignment is achieved well after the spinal surgery is performed.

The computer 110 may then analyze the original medical images and medical data, and any models generated therefrom, to recommend instructions for constructing a surgical device or spinal device using a manufacturing apparatus 115, such as a milling machine and/or a printing device. In embodiments, manufacturing apparatus 115 may also be an additive manufacturing apparatus, such as a 3-D printer capable of creating surgical devices in a number of materials. In some instances, manufacturing apparatus 115 may be supplemented by or replaced by another manufacturing apparatus, such as a machine designed to bend spinal rods beyond their current configuration.

The manufacturing apparatus 115 may be any machine capable of responding to numeric data and instructions received from a computer, such as computer 110. In this regard, the manufacturing apparatuses 115 may communicate with the computer 110 through a communications interface 220 (described herein) and/or via a networked connection, such as a connection through the Internet, a local area network, and/or a private network.

Alternatively or additionally, computer 110 may determine commands to send via a wireless communications link to a device, such as implanted device 117, that may be implanted in, on, or near a spine, or otherwise is attached, mounted to, or positioned in the vicinity of the spine. The commands may include a command to activate a motor to change a dimension of the implanted device 117 to change the position of at least a portion of the spine.

Figure 2:
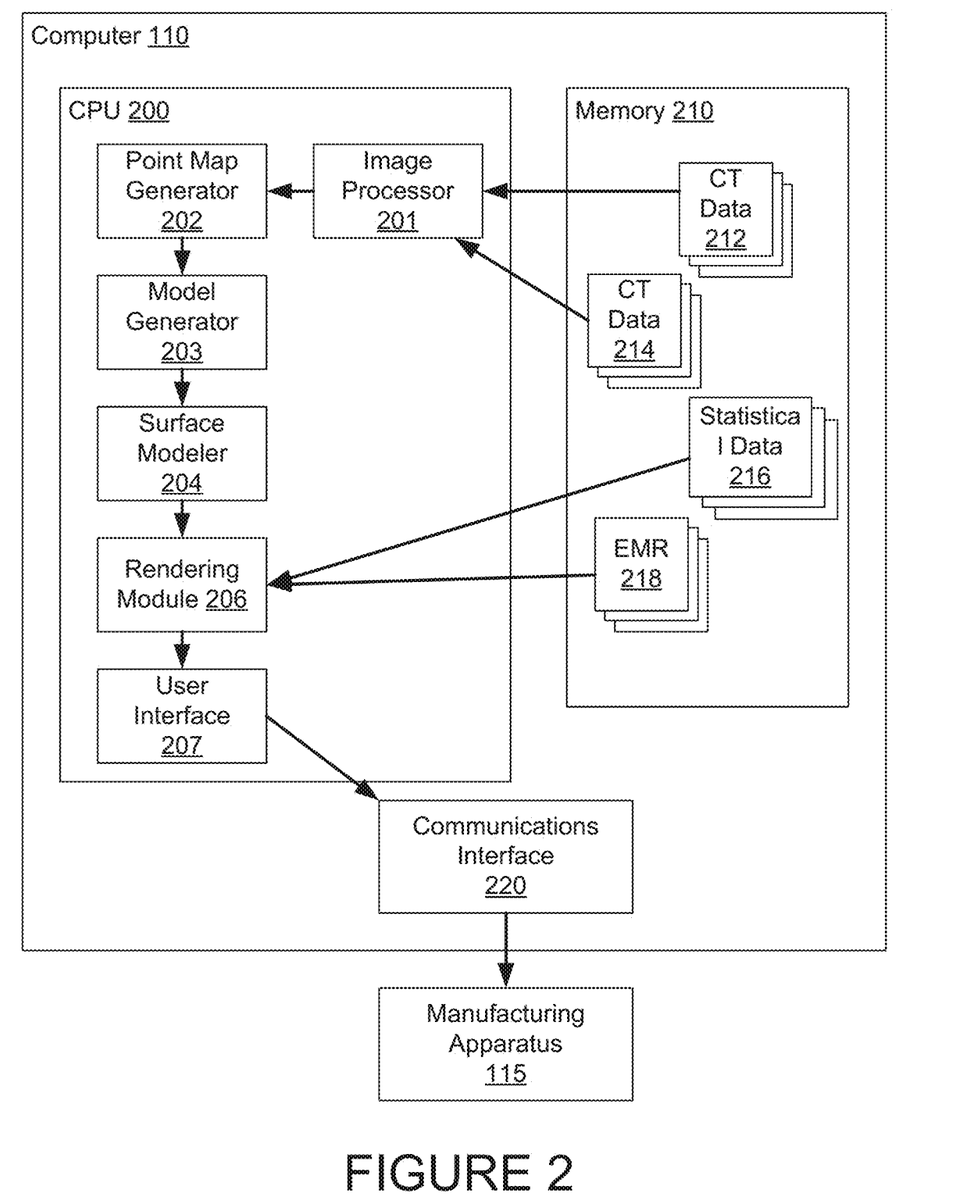
FIG. 2 is a block diagram illustrating a computer in the system architecture of FIG. 1 in accordance with some embodiments.

FIG. 2 is a block diagram illustrating computer 110 coupled to manufacturing apparatus 115, such as a milling machine or three-dimensional printer employed in the system architecture 100 of FIG. 1. Computer 110 includes central processing unit 200 and memory 210. In some embodiments, a portion of the medical images stored in cloud server 106 are retrieved from the cloud server 106 by computer 110, such as through a networked connection. The retrieved medical images may be stored in memory 210. The medical images retrieved from cloud server 106 may include a stack of CT scan data slice images 214 of one or more spines. Computer 110 and cloud server 106 may also include other components typically found on a computing device, such as input devices (e.g., keyboard, mouse, microphone, etc.) display devices (e.g., touchscreens, monitors, etc.) and networking interface devices, etc. Although not illustrated, cloud server 106 may also include some or all of the components in computer 110.

Computer 110, under the control of the central processing unit 200, may also retrieve electronic medical records 218 from cloud server 106. Memory 210 may also store statistical data 216 that may be useful in analyzing images 212, 214, and electronic medical records 218. In some instances, the statistical data 216 may be retrieved from the cloud server 106 and/or medical database 104 by the computer 110.

According to embodiments of the present disclosure, the CPU 200 may execute computational modules, such as an image processing module 201, point map generator module 202, a model generator 203, surface modeler module 204, rendering module 206, and a User Interface module 207. The processes executed via the computational modules by CPU 200 are described with reference to the flow diagrams of FIG. 3 below.

Components of the system of the present disclosure can be embodied as circuitry, programmable circuitry configured to execute applications such as software, communication apparatus applications, or as a combined system of both circuitry and software configured to be executed on programmable circuitry. Embodiments may include a machine-readable medium storing a set of instructions which cause at least one processor to perform the described methods. Machine-readable medium is generally defined as any storage medium which can be accessed by a machine to retrieve content or data. Examples of machine readable media include but are not limited to magneto-optical discs, read only memory (ROM), random access memory (RAM), erasable programmable read only memories (EPROMs), electronically erasable programmable read only memories (EEPROMs), solid state communication apparatuses (SSDs) or any other machine-readable device which is suitable for storing instructions to be executed by a machine such as computer 110.

Figure 3:
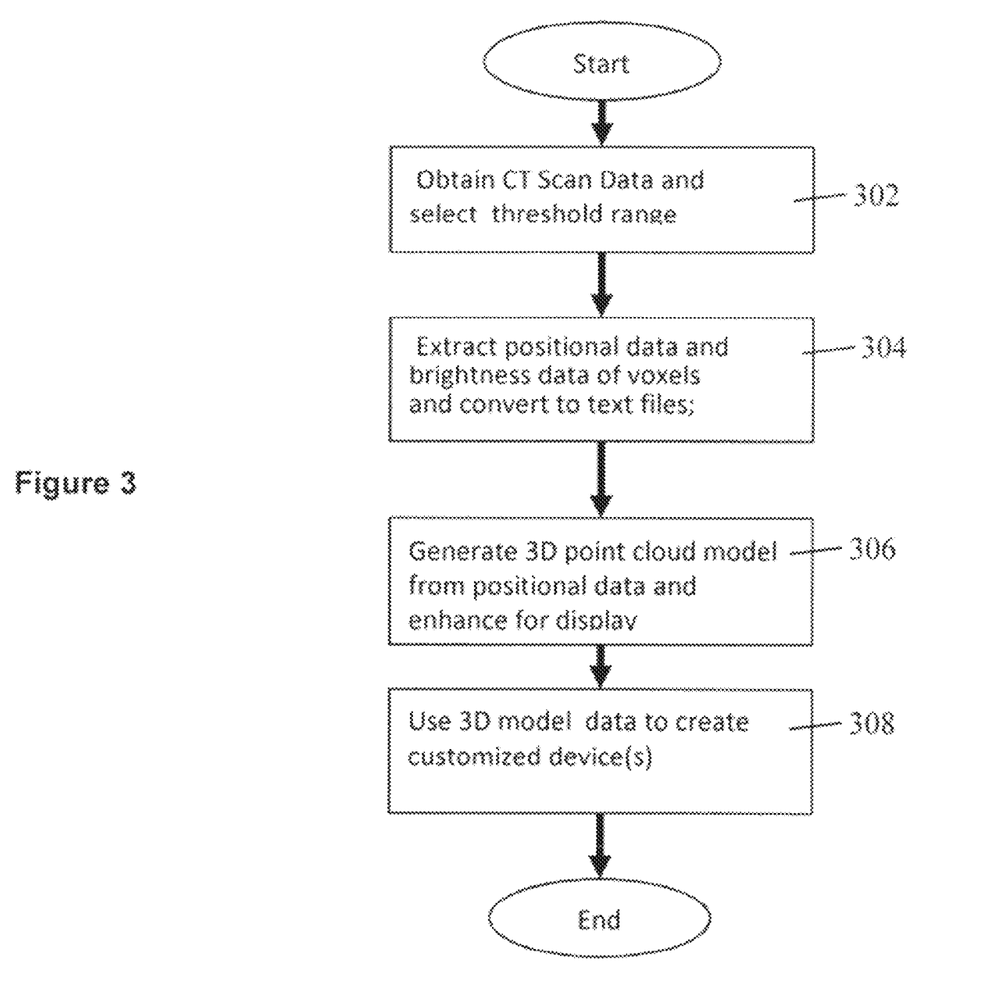
FIG. 3 is a flow diagram illustrating a process for constructively generating multilayer point cloud models of anatomical structures in accordance with some embodiments.

FIG. 3 is a flow diagram illustrating a process for constructively generating multilayer point cloud models of anatomical structures. In the illustrated embodiment, imaging apparatus 102 may be implemented with any number of commercially available CT scanner apparatus, the output data of which may be stored in cloud server 106 or medical database 104. The CT scan data is obtained from the cloud server 106 or medical database 104 and is stored in memory 210 as CT data 212 and 214, as illustrated by process block 302. Note that the CT scan image data does not have to be in DICOM standard format. The CT scan image data may be images of a spine and may include images obtained both before and after a previous surgical procedure, e.g., a procedure performed on the spine.

Figures 4A, 4B:
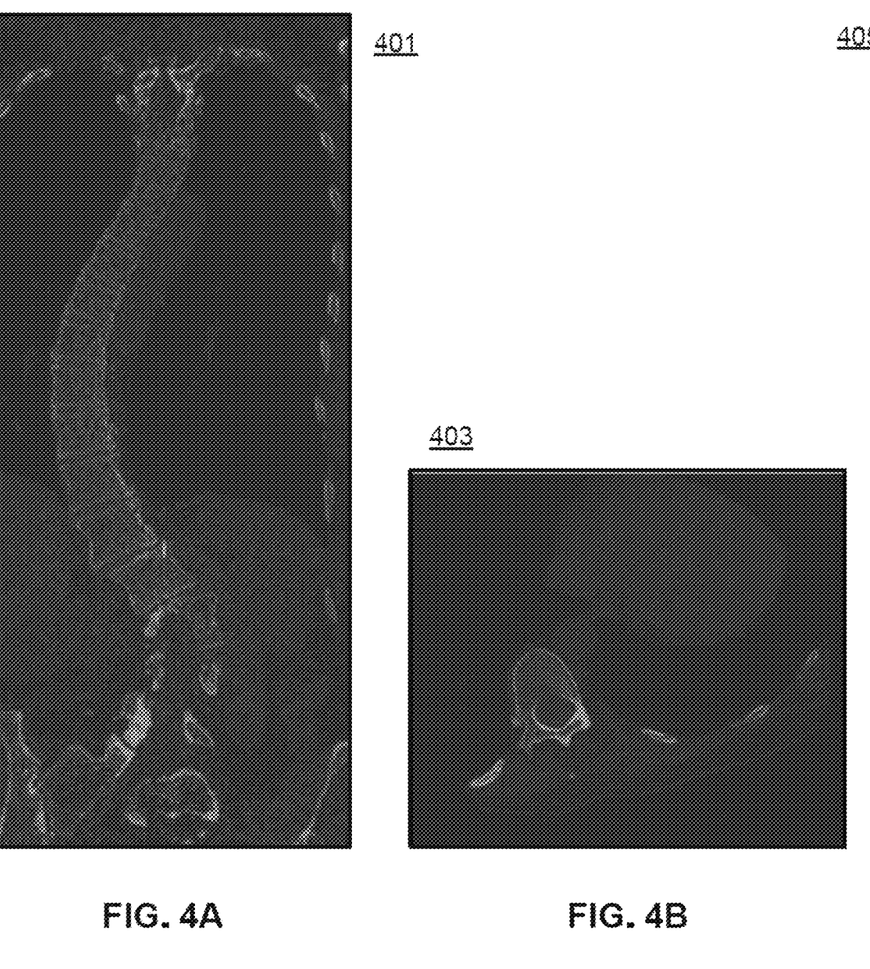
FIGS. 4A-4C illustrate medical images from which a three-dimensional model will be derived in accordance with the disclosure.
Figure 4C:
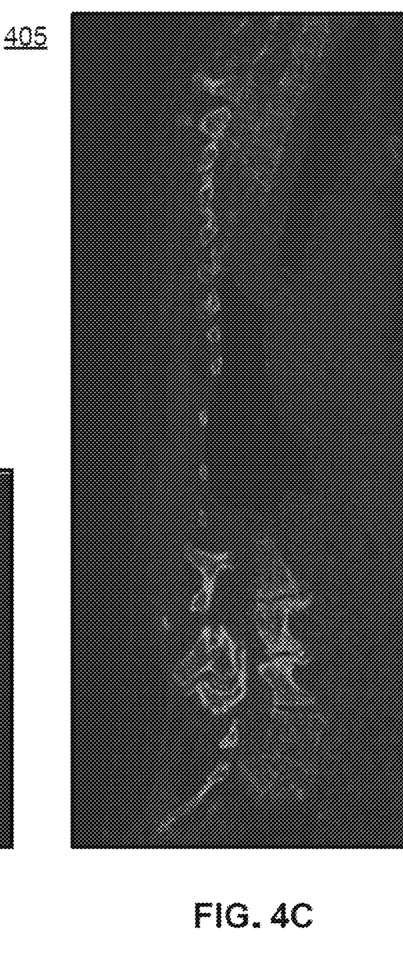

Once the CT scan data has been stored in memory 210 it is accessed by the image processing module 201 which is capable of generating multiple two-dimensional image views, similar to images 401, 403, and 405 illustrated in FIGS. 4A-C, respectively, and as illustrated by block 304. In this regard, the image processing software module 201 may be implemented with a software application configured to simulate and evaluate surgical treatment options based on images acquired from Computerized Tomography (CT) or Magnetic Resonance Imaging (MRI) scanner. An example of such image processing software is Materialise Mimics, commercially available from Materialise, Plymouth, MI. The image processing software module 201 may transfer imaging information from a medical scanner such as a CT scanner or a Magnetic Resonance Imaging scanner to an output file.

Figures 5A, 5B:
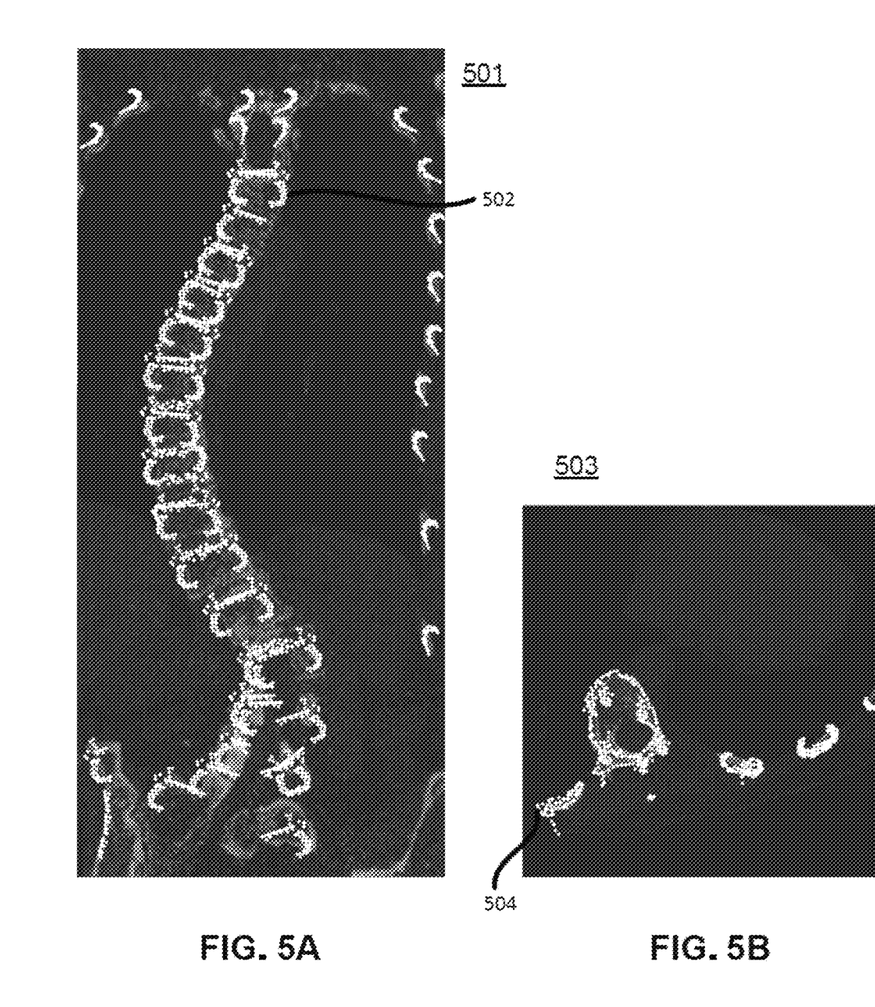
FIGS. 5A-5C illustrate the medical images of FIGS. 4A-4C, respectively, with elements having associated parameter value within a predetermined range highlighted on the images in accordance with the disclosure.
Figure 5C:
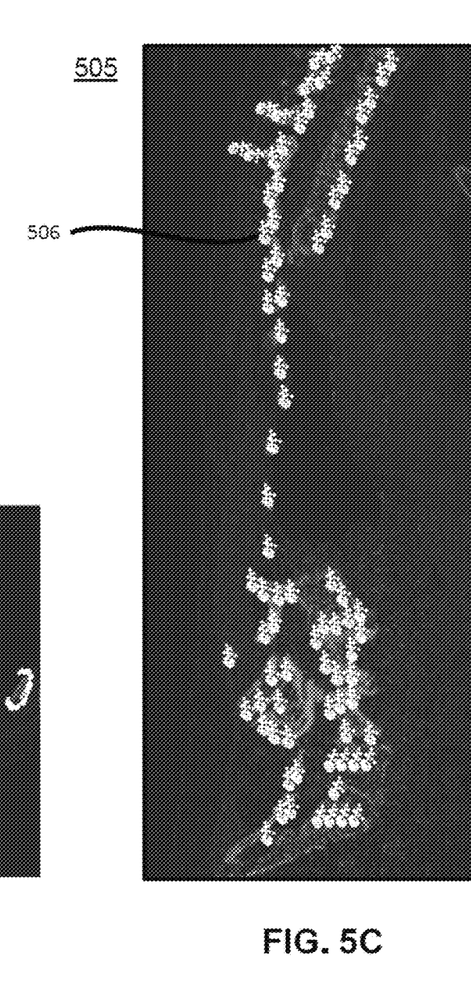
Figure 5D:
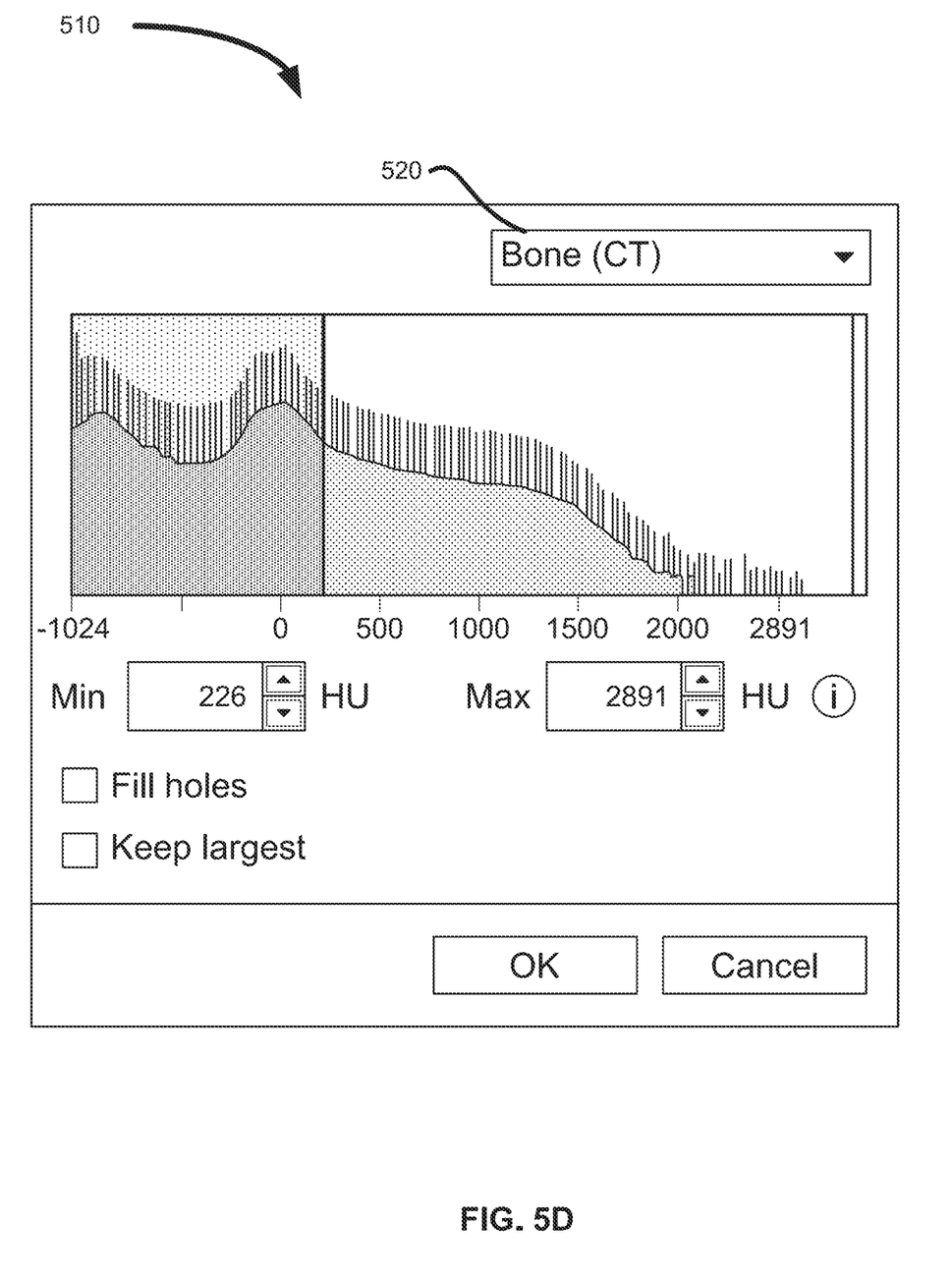
FIG. 5D illustrates a user interface in accordance with the disclosure.

Next, using image processing module 201, the clinician may select a threshold value or range or values representing a brightness intensity which is characteristic of the anatomical features to be modeled, such as bone, as indicated by block 306. For instance, image 501 in FIG. 5A illustrates bone found in image 401, image 503 in FIG. 5B illustrates bone found in image 403, and image 505 in FIG. 5C illustrates bone found in image 405. The clinician may select a range of values for brightness intensity or, in the case of CT data, radio density, which captures the image data most closely cited associated with the anatomical feature(s) of interest. Some commercially available imaging software, such as Materialise Mimics, may have a predefined user interface, such as user interface 510 illustrated in FIG. 5D and a selection of predefined threshold values 520 which may be selected by the clinician, including values associated with bone.

In the visualization and analysis of three-dimensional data, especially scientific and medical data, a voxel represents a value on a regular grid in three-dimensional space. As with pixels in a bitmap, voxels themselves do not typically have their position, e.g., their coordinates, explicitly encoded along with their values. Instead, rendering systems infer the position of a voxel based upon its position relative to other voxels. In other words, a voxel's position in a data is based upon it is position relative to other voxels which make up a single volumetric image. For this reason, voxels excel at representing regularly sampled spaces that are non-homogeneously filled, such as the output from a CT scanner.

A voxel represents a single sample, or data point, on a regularly spaced, three-dimensional grid. This data point can consist of a single piece of data, such as an opacity, or multiple pieces of data, such as a color in addition to opacity. The value of a voxel may represent any number of various properties. In CT scans, the value associated with each voxel is generally a Hounsfield unit, which provides the opacity of material to X-rays. Medical-grade CT scanners generally use the Hounsfield scale as a quantitative standard for describing radio density. A change of one Hounsfield unit (HU) represents a change of 0.1% of the attenuation coefficient of water. The Hounsfield scale provides a universally available reference and is suited to the application for which computed axial tomography was developed: imaging the internal anatomy of living creatures based on organized water structures.

In FIGS. 5A-C, the voxels in the image satisfying the threshold condition may be visually displayed with distinction, such as with a different color, shape, shade, etc. The raw data describing the voxels 502, 504, and 506 are shown in FIGS. 5A-C, respectively. For clarity only a portion of voxels 502, 504, and 506 are illustrated. The voxels satisfying the threshold condition are exported by the image processing module 201 as a text file to point map generator module 202, as illustrated by block 308. The format of the raw data comprises x,y,z coordinates and the Hounsfield unit value (collectively the Hounsfield unit data) of each identified voxel. In one embodiment, a file containing the positional data of the voxel's is exported in one file and the Hounsfield unit values for the corresponding voxel's are exported in a separate file, although the positional data and Hounsfield unit values may be provided in any combination and number of files.

The image processing software can create a 3D model of the CT data highlighted from a particular threshold, such as a green threshold. The model can be exported via the communications interface 220 as files for manufacturing, such as 3D printing or milling, or just the point cloud can be exported.

Once the raw data comprising the x,y,z coordinates and the Hounsfield unit value of each identified voxel are exported and stored in memory 210, such data may be accessed by point map generator module 202. Model generator module 203 is configured for accessing and rendering as a three-dimensional model any of the positional data or the radio density data, or both, as illustrated by block 306, in conjunction with rendering module 206, and a User Interface module 207.

Figure 6:
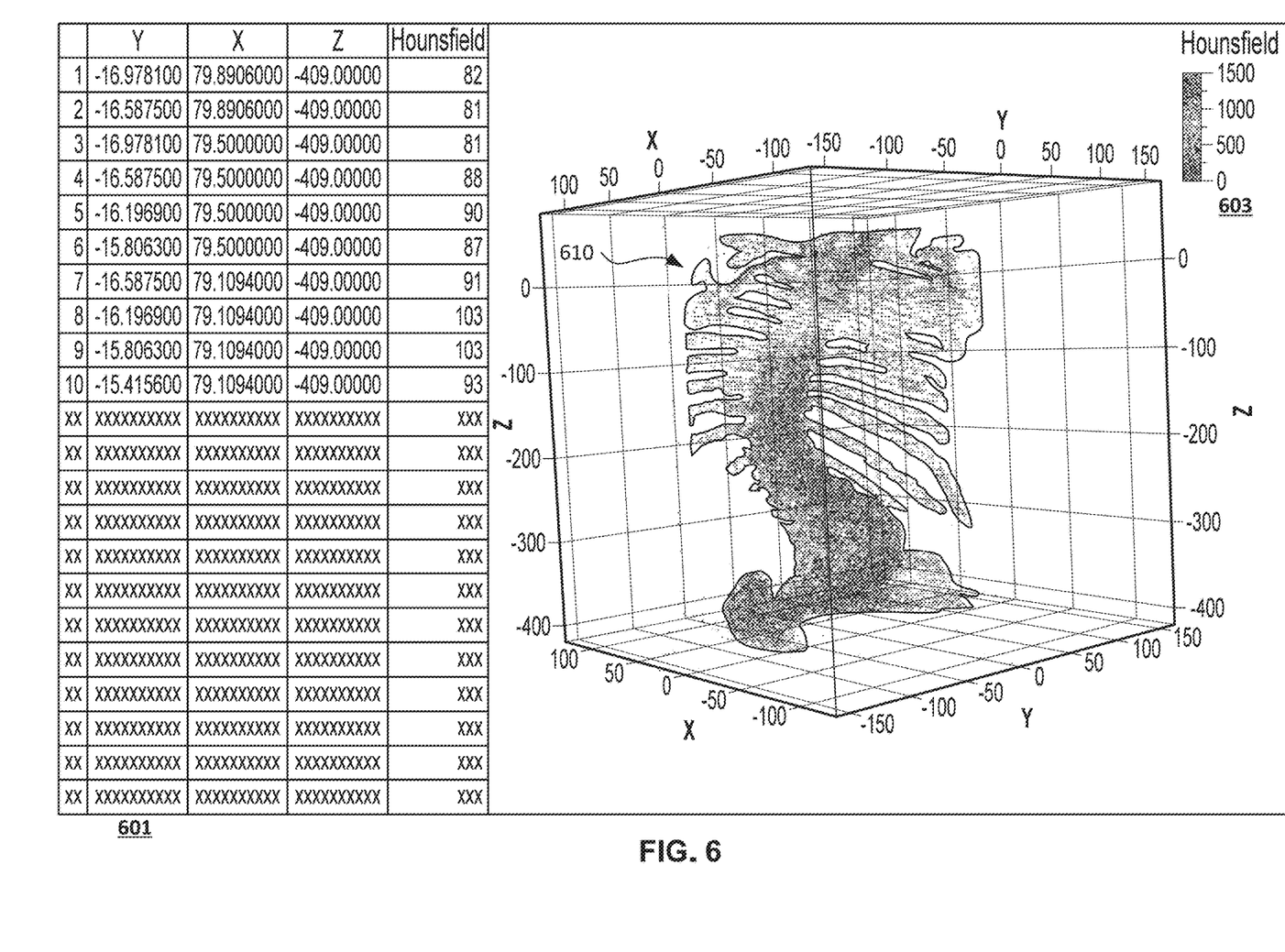
FIG. 6 illustrates a three-dimensional model of radio capacity data in accordance with the disclosure.

FIG. 6 illustrates a three-dimensional 3D scatterplot model 610 created from just the Hounsfield unit data 601 stored in memory 210. As illustrated in FIG. 6, the scatterplot of the data from approximately 2.8 million rows form axial slices that are similar to a point cloud model. For illustration purposes, only a portion of the Hounsfield unit data 601 are shown in FIG. 6. Each voxel in the 3D scatterplot model 610 may consist of a particular color, shade, shape, etc., according to its respective Hounsfield value, such as shown in key 603.

Figure 7:
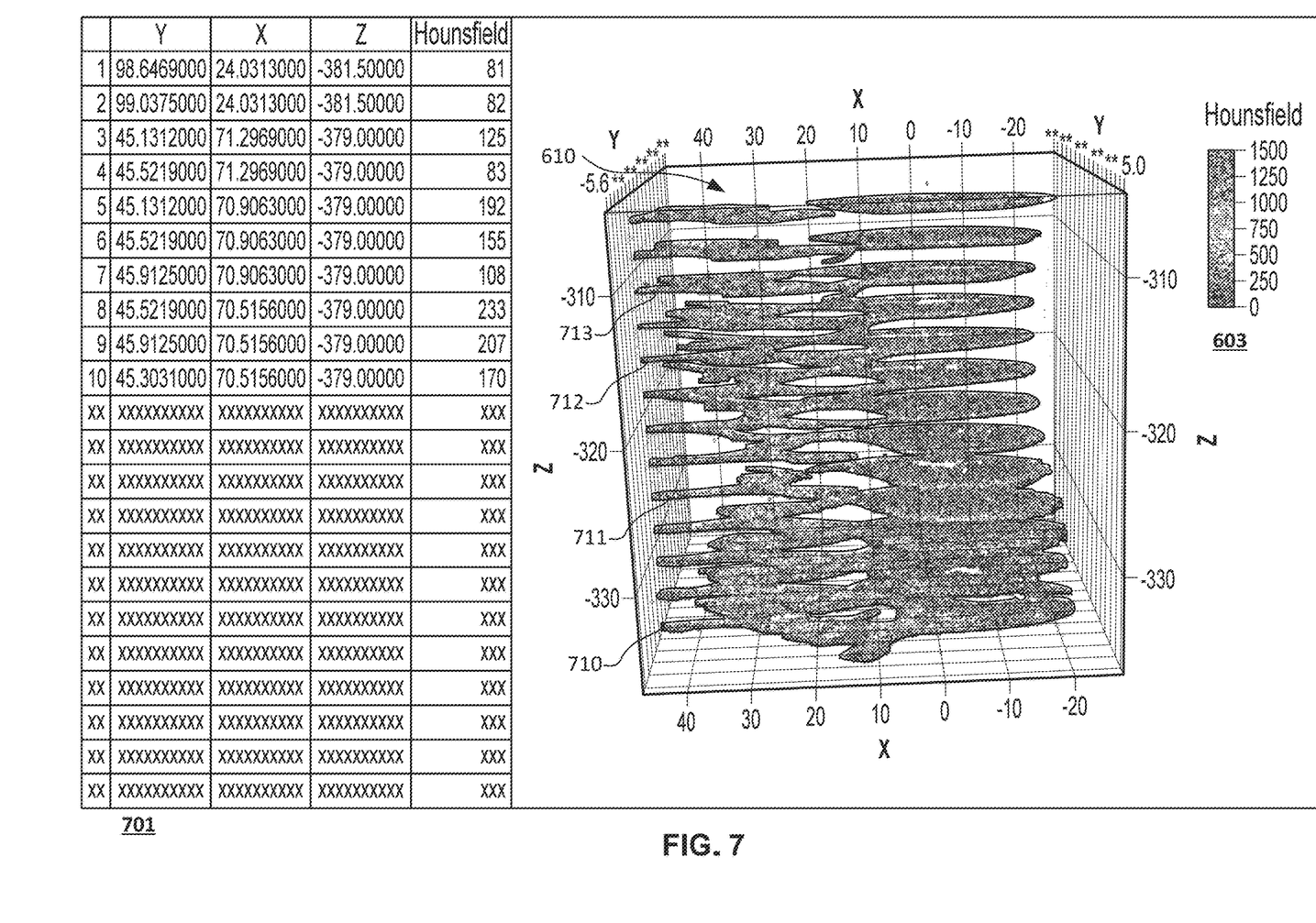
FIG. 7 illustrates a close up image of a portion of the three-dimensional model of FIG. 6 in accordance with the disclosure.

User Interface module 207 enables a specific portion or area of the three-dimensional 3D scatterplot model 610 to be enlarged or zoomed on the display, as illustrated in FIG. 7 in which Hounsfield unit data 701 can be seen as individual slices 710-713. For clarity, only a subset of slices in the three-dimensional model are labeled.

Figure 8:
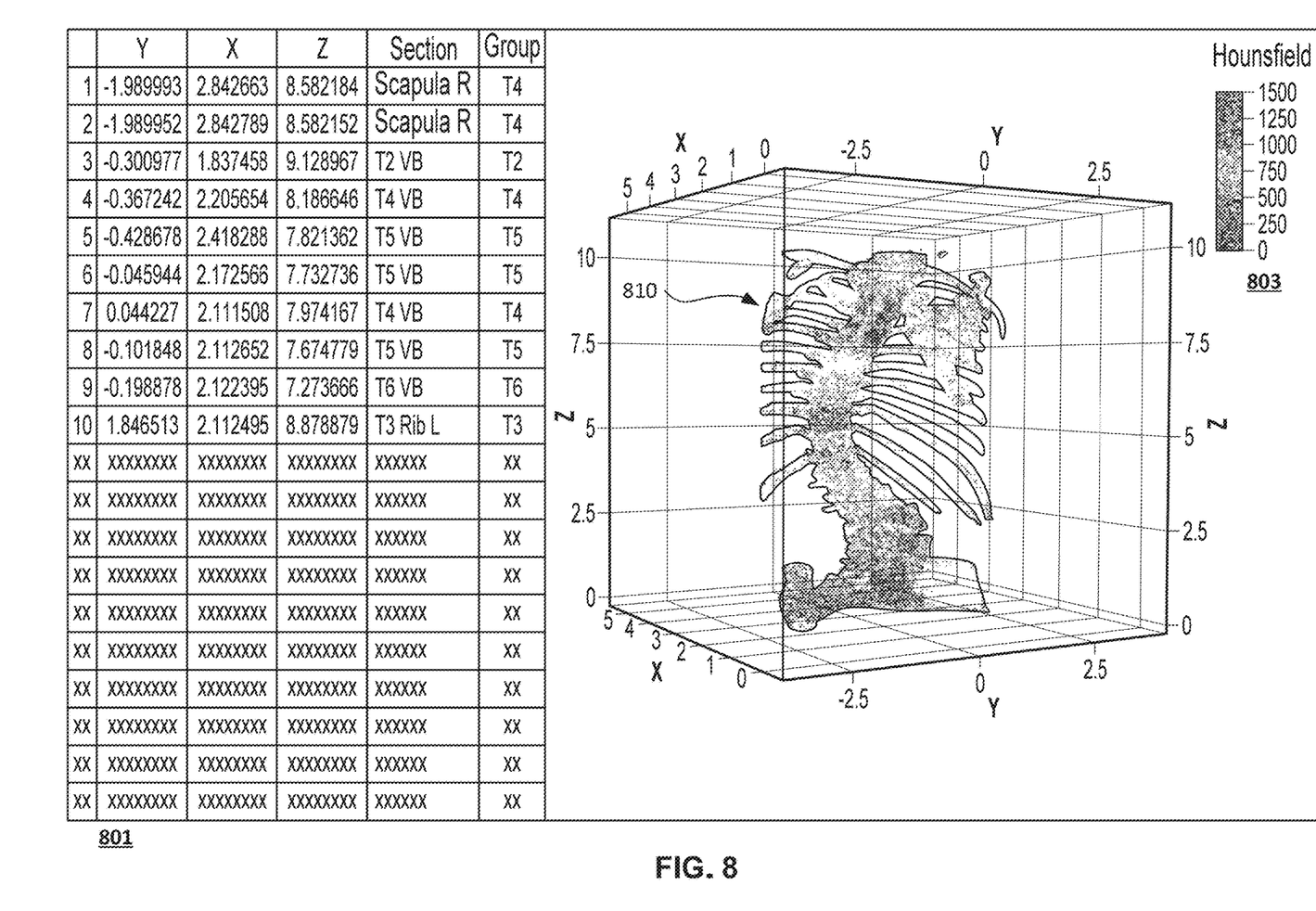
FIG. 8 illustrates a three-dimensional point-cloud model in accordance with the disclosure.

Rendering module 206 is configured for accessing and rendering as a three-dimensional point cloud model any of the positional data stored in memory 210 by itself or optionally with the radio opacity data, as illustrated by block 306. FIG. 8 is a three-dimensional point cloud model 810 illustrating some of the vertebral bodies within the spinal column and other bony structures within the pelvic area based on positional data 801. The points in the three-dimensional point cloud model 810 may be represented by different identifiers, such as colors, shapes, shades, etc., as shown in key 803. In some instances, each structure (e.g., vertebrae, bone, portion of bone, etc.) may be assigned a particular identifier.

Figure 9:
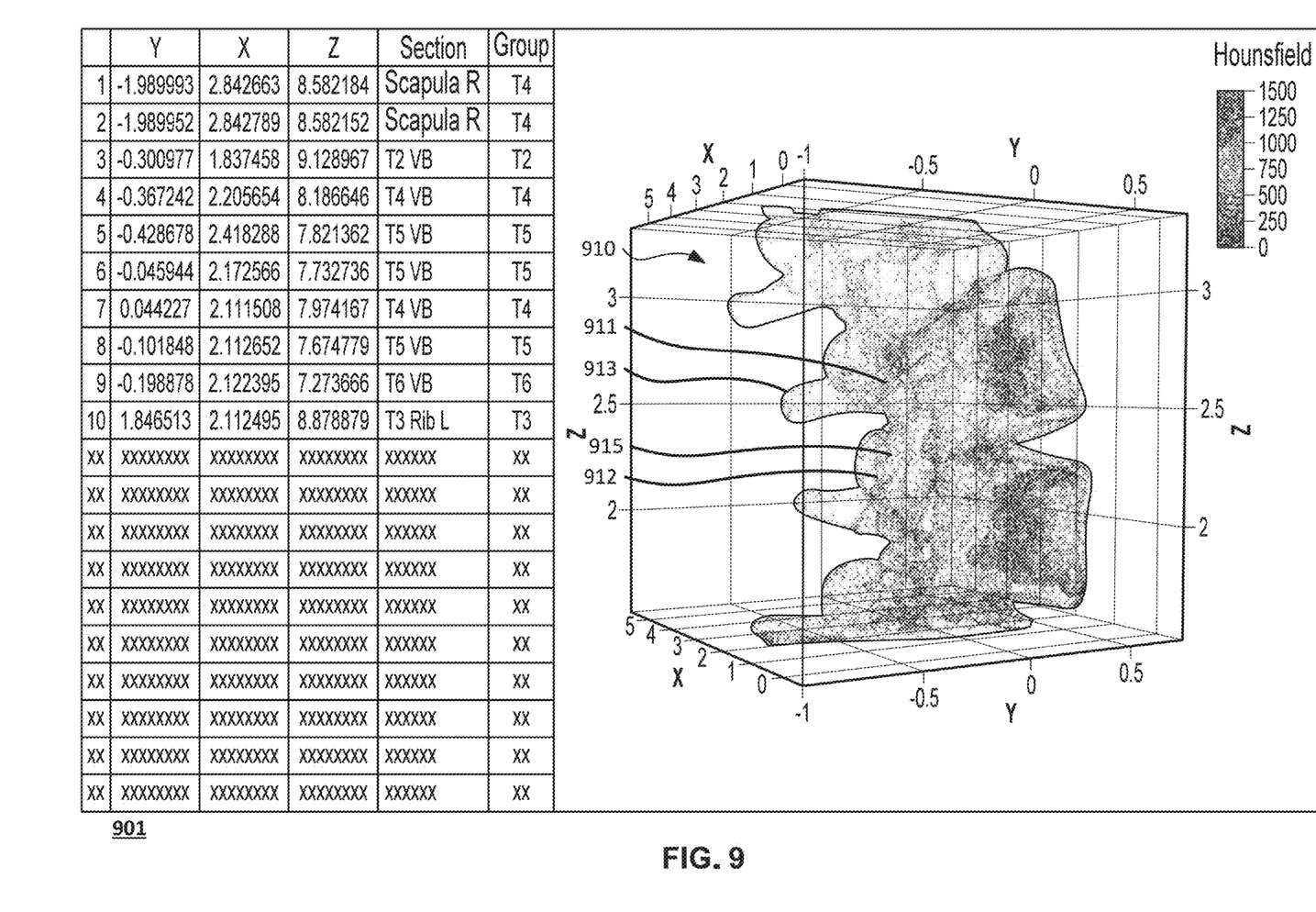
FIG. 9 illustrates a close up image of a portion of the three-dimensional point-cloud model of FIG. 8 in accordance with the disclosure.

FIG. 9 illustrates a close up image 910 of a portion of the three-dimensional point-cloud model 810 of FIG. 8 in which vertebral bodies L4 (912) and L3 (911) can be seen with a first plurality of points 913 in the point cloud model representing the cortical bone exterior perimeter of the vertebral body and the second plurality of points 915 clustered in the interior thereof indicating cancellous bone regions contained within the exterior of cortical bone exterior. The close up image 910 may be generated from positional data 901, which may correspond to a subset of data 801.

Figure 10:
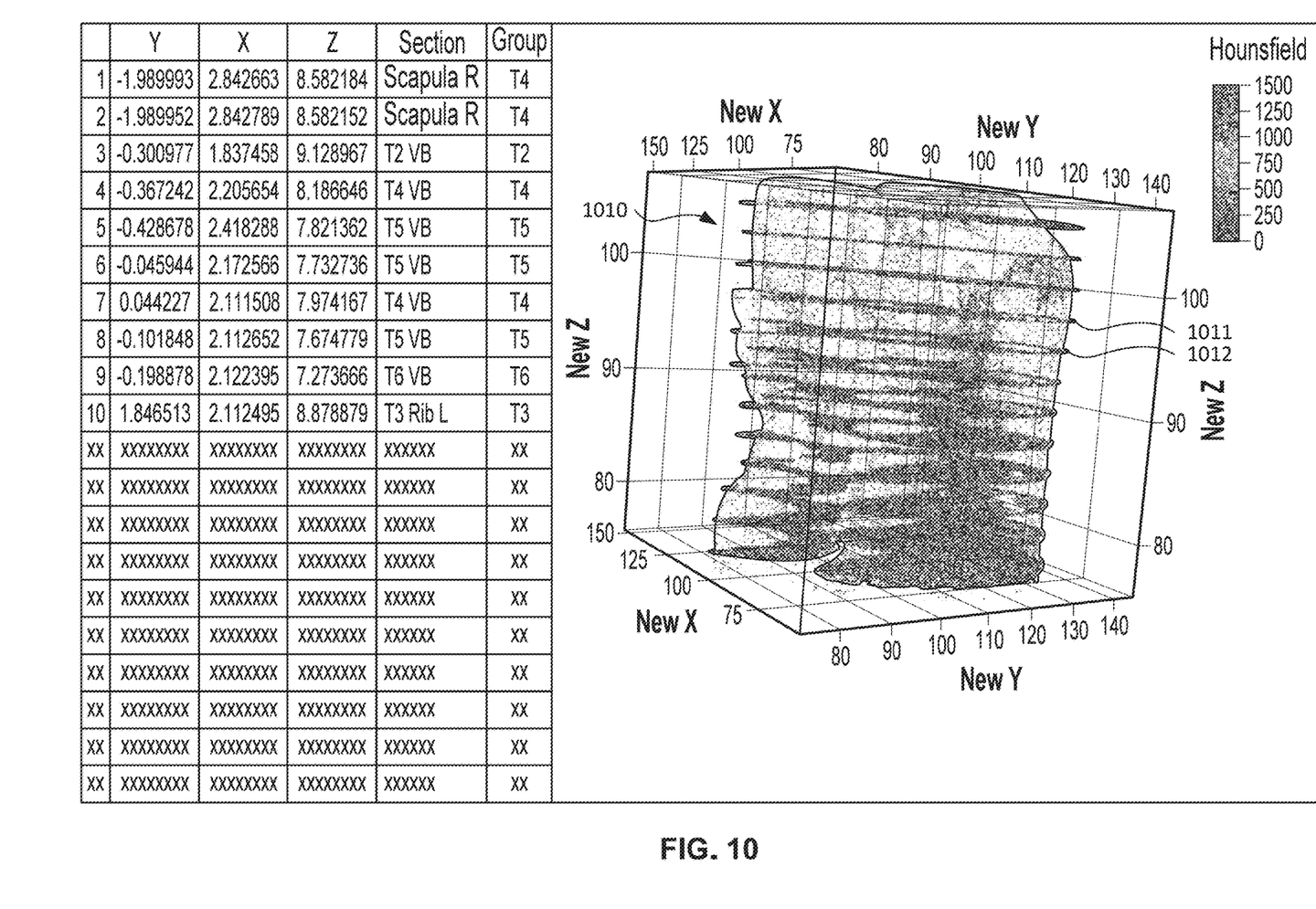
FIG. 10 illustrates a hybrid three-dimensional model in accordance with the disclosure.

FIG. 10 illustrates a hybrid three-dimensional model 1010 including slices of a scatterplot 1011, 1012 overlaid on a corresponding three-dimensional point cloud model 1010. As can be seen in FIG. 10, the three-dimensional point cloud model 1010 provides a surgeon with a visual indication of the exterior surface of a vertebral body. The slices of the scatterplot 1011, 1012 provide an indication of higher density bone beneath the cortical bone surface which is more dense than the cancellous bone.

At block 308, the surgical device is constructed, for later deployment in, at, or near the spine based on the parameters of the surgical device determined based on an analysis of at least the three-dimensional model of the spine of the target patient. For example, the surgical device may be formed using manufacturing apparatus 115, such as a milling machine by inserting an object in the milling machine and providing instructions from the computer 110 to the milling machine to remove material from the object to form a surgical device according to the parameters or dimensions determined during the analysis of the three-dimensional model.

Alternatively, numeric data and instructions may be provided to another manufacturing apparatus, such as a machine designed to bend spinal rods beyond their current configuration, such machine capable of responding to numeric data and instructions from communications interface 220. Such numeric data and instructions may also be provided through a user interface 207 associated with communications interface 220 in which the data may be presented to a user for manual manipulation of a spinal device.

Module 215 may be partially implemented with a software application named Materialise 3Matic, commercially available from Materialise, Plymouth, MI that is intended for use for computer assisted design and manufacturing of medical exo- and endo-prostheses, patient specific medical and dental/orthodontic accessories and dental restorations.

The three dimensional models developed in accordance with the systems and techniques described herein may be used to determine the parameters, e.g., dimensions, angles, or configurations, of the surgical device to be deployed in a patient so as to counter at least one of coronal imbalance or sagittal imbalance. Once the coordinates in X-Y-Z dimensions are obtained, the determined parameters of the surgical device may be translated into instructions or commands for a milling machine or a three-dimensional printer to manufacture or form the surgical device.

Alternatively or additionally, predicted change in the positions of a patient's spine may be used to adjust the parameters, e.g., dimensions or configurations, of one or more adjustable surgical devices, e.g., intervertebral devices used to achieve a targeted curvature of the spine, that already have been deployed in a patient's spine. Examples of adjustable surgical devices are described in U.S. Pat. Nos. 9,585,762, 9,393,130, 9,408,638, 9,572,601, and 9,566,163, and in Pub. Nos. WO 2017/027873, US 2016/0166396, US 2016/0317187, and US 2016/0022323, the contents of each of which are hereby incorporated by reference in their entireties.

It should be appreciated that the three-dimensional point cloud reconstruction created using the processes and systems described herein provides a surgeon with a visual indication of both the exterior surface of a vertebral body as well as an indication of higher density bone beneath the cortical bone surface which is more dense than the cancellous bone. Based on the surgeon's observation of higher than normal bone density under the exterior cortical bone surface, more accurate decisions can be made regarding nature and types of screws and/or other hardware which are supportable by the increased density bone within a vertebral body.

The above process may be utilized with other bony structures within the body as well as potentially softer tissue depending on its detectability and pixel density through the original acquisition process whether through computerized tomography, magnetic resonance imaging, or other processes.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope and spirit of the claims appended hereto. For example, while the present disclosure makes reference to the spine, the present disclosure contemplates application of the systems and methods to other types of bony structures, such as bony structures in an arm, hand, leg, or foot.

What is claimed is:

1. A method for generating a point cloud model of an anatomical feature, the method comprising:
accessing a three-dimensional array of data elements describing multiple anatomical features of a subject, each of the data elements having associated therewith positional data and a separate parameter value;
identifying any data elements in the three-dimensional array having an associated parameter value within a predefined range of threshold values associated with at least one anatomical feature, wherein the anatomical feature includes at least one bony anatomical structure;

acquiring positional data associated with the data elements identified as having an associated parameter value within the predefined range of threshold values associated with the anatomical feature and storing acquired positional data in memory; and generating, from the acquired positional data stored in the memory associated with the identified data elements, a visually displayable three-dimensional point cloud model of the bony anatomical structure having a first three-dimensional point cloud model which illustrates an exterior cortical bone surface of the bony anatomical structure and a second three-dimensional point cloud model which illustrates a density of cancellous bone beneath the exterior cortical bone surface of the bony anatomical structure.

2. The method of claim 1, wherein the data elements are voxels.

3. The method of claim 1, wherein the three-dimensional array is generated from a CT scan.

4. The method of claim 1, wherein each parameter value comprises a Hounsfield unit value.

5. The method of claim 1, wherein the anatomical feature comprises a vertebral body.

6. The method of claim 1, wherein both of the first and second three-dimensional point cloud models being simultaneously displayable within the three-dimensional point cloud model of the bony anatomical structure such that the exterior cortical bone surface and the density of the cancellous bone beneath the exterior cortical bone surface are simultaneously visually discernable.

7. The method of claim 1, wherein each parameter value represents a measurement of radio density.

8. A viewable three-dimensional point cloud model simultaneously defining an exterior perimeter of representing cortical bone of a bony anatomical structure and regions of cancellous bone interior of the exterior perimeter, the three-dimensional point cloud model prepared by a process comprising:

accessing a three-dimensional array of data elements describing at least a portion of a physical anatomy of a subject, the portion including the bony anatomical structure and each of the data elements having associated therewith positional data and a separate radio density value;

identifying any data elements in the three-dimensional array having an associated radio density value within a predefined range of threshold values;

acquiring positional data associated with the data elements identified as having an associated radio density value at least equal to the threshold value and storing the acquired positional data in memory; and generating from the acquired positional data stored in the memory a visually displayable three-dimensional point cloud model of the portion including the bony anatomical structure; and wherein the visually displayable three-dimensional point cloud model includes a first three-dimensional point cloud model which illustrates an exterior cortical bone surface of the bony anatomical structure and a second three-dimensional point cloud model which illustrates a density of cancellous bone beneath the exterior cortical bone surface of the bony anatomical structure.

9. The process of claim 8, wherein the data elements are voxels.

10. The process of claim 8, wherein there are less points comprising the three-dimensional point cloud model of the bony structure than data points comprising the three-dimensional array.

11. The process of claim 8, wherein the three-dimensional array is generated from a CT scan.

12. The process of claim 8, wherein each parameter value comprises a Hounsfield unit value.

13. A system for generating a three-dimensional point cloud model of an anatomical structure, the system comprising:

a computer accessible memory operational to store a three-dimensional array of data elements describing multiple anatomical features of a subject, each of the data elements having associated therewith positional data and a separate parameter value; and a processor, operatively coupled to the computer accessible memory, operational to identify any data elements in the three-dimensional array having an associated parameter value satisfying a predefined threshold value associated with at least one anatomical feature, the processor further operational to acquire from the computer accessible memory, positional data associated with the data elements identified as having an associated parameter value satisfying the predefined threshold value and store the acquired positional data in a computer memory;

wherein the processor is further operational to generate, from the acquired positional data stored in the computer memory, a visually displayable three-dimensional point cloud model of at least one anatomical structure including a bony anatomical structure having a first plurality of points in the three-dimensional point cloud model which define an exterior perimeter of the bony anatomical structure and a second plurality of points in the three-dimensional point cloud model which define at least one feature interior of the exterior perimeter of the bony anatomical structure, both the first plurality of points and the second plurality of points in the three-dimensional point cloud model being simultaneously visually discernable;

wherein the first plurality of points in the three-dimensional point cloud model define an exterior perimeter of cortical bone of the bony anatomical structure; and wherein the second plurality of points in the three-dimensional point cloud model define regions of cancellous bone interior to the exterior perimeter of cortical bone in the bony anatomical structure.

\* \* \* \* \*